Sept. 26, 1950     J. B. GEHMAN     2,523,363
METHOD AND APPARATUS FOR FILLING CONTAINERS WITH
A PREDETERMINED AMOUNT OF DIELECTRIC MATERIAL
Filed Jan. 26, 1945
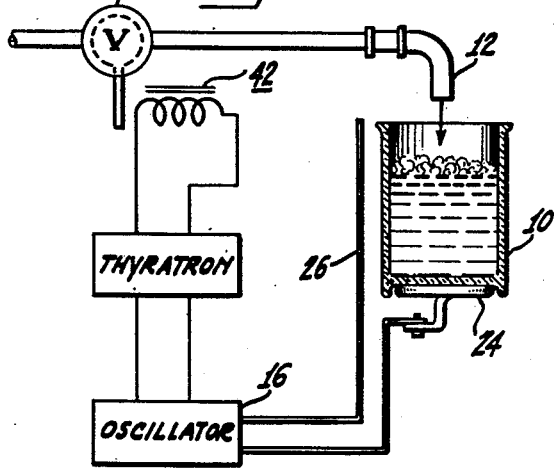
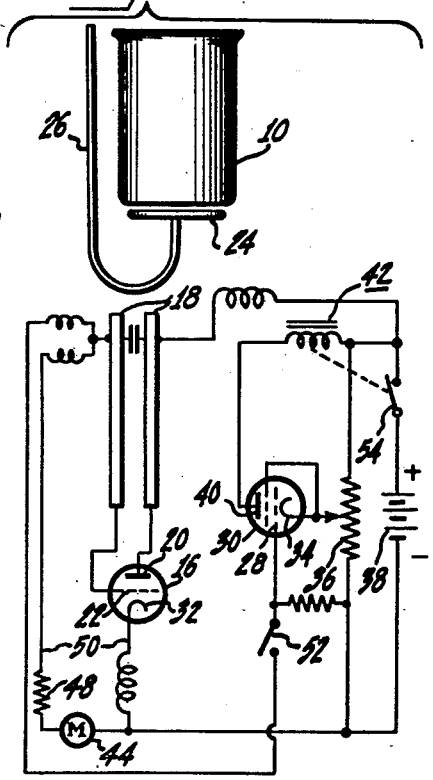
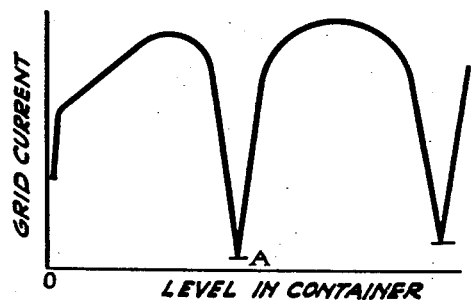
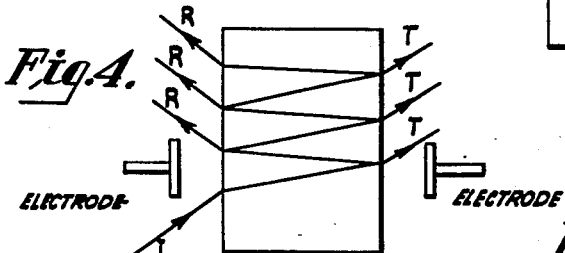
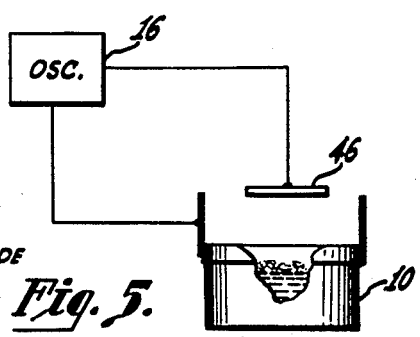
I = INCIDENT WAVE
T = TRANSMITTED WAVE
R = REFLECTED WAVE
INVENTOR.
JOHN B. GEHMAN
BY
ATTORNEY Patented Sept. 26, 1950

2,523,363

UNITED STATES PATENT OFFICE 2,523,363

METHOD AND APPARATUS FOR FILLING CONTAINERS WITH A PREDETERMINED AMOUNT OF DIELECTRIC MATERIAL

John B. Gehman, Noblesville, Ind., assignor to Radio Corporation of America, a corporation of Delaware Application January 26, 1945, Serial No. 574,778

12 Claims. (Cl. 226—127)

1

This invention relates to the measurement of the level of liquids, powders, and other pourable materials and finds particular, though not exclusive, application in apparatus for filling containers with such materials to a predetermined level.

Devices of the prior art for these purposes have made use of changes in photoelectric current, or in vibration, or in electrical capacity, caused by a change in the level of the material to be measured. However, when devices of these types have been used with materials which froth, it has been difficult, if not impossible, to distinguish between the actual and froth level.

It is, therefore, an object of the invention to provide a method of and means for measuring the actual as distinguished from the froth level of pourable dielectric material.

A further object is the provision of an improved method of and means for filling a container with pourable dielectric material to a precise and predetermined level.

Another object is the provision of an improved sensitive and accurate dispensing device for liquids, powders and the like.

An additional object is the provision of improved means for indicating a change in the level of pourable dielectric material.

According to the invention, these objects are achieved by effectively connecting the material, the level of which is to be measured with a source of electrical energy of ultra high-frequency. When other conditions affecting the same are constant, the material at a given level is resonant with the source of energy at a particular frequency. Electrical changes accompanying resonance may be employed to provide an indication of the level, to cut off the supply of material, or to perform such other operation as may be desired.

The invention is illustrated by the accompanying drawings, in which:

Figure 1 is a schematic illustration of a beverage dispensing device in accordance with the invention, Figure 2 is a circuit diagram of the electronic parts of the device of Fig. 1, Figure 3 is a graph showing the relation of grid current of the oscillator of Fig. 1 to the level of material to be measured, Figure 4 is a diagram illustrating the operation of the invention, and Figure 5 is a schematic illustration of an alternative embodiment of the invention.

Referring to Figs. 1 and 2, a dielectric liquid from any appropriate source (not shown) is supplied to a container 10 by means of a tap 12, the supply of liquid being controlled by a valve 14. In the present embodiment the container may be of any dielectric material, for example, glass, Bakelite or the waxed paper now commonly used for containers of carbonated and other beverages.

An ultra high-frequency oscillator 16, which may be of RCA type 995, is provided with a tank circuit 18 constituted by a quarter wave section of concentric line connecting the anode 20 and grid 22 of the oscillator. Closely coupled to the tank circuit is a utilization circuit, one section of which may be formed by a flat spiral or plate 24 upon which the dielectric container rests. The other section of the utilization circuit is a conductor 26 running parallel to the length of the container and adjacent to it. Close inductive coupling is accomplished between the tank circuit 18 and the half loop of the antenna rod 26.

A circuit 50 connecting the grid 22 of the oscillator to its cathode 32 includes a resistor 48 and a meter 44 for measuring grid current of the oscillator. The grid of the oscillator is also connected to the control grid 28 of a gas tube 30, which may be of RCA type 2050, the cathode 32 of the oscillator being connected through appropriate elements to the cathode 34 of the gas tube. A potentiometer 36 connected to a source of supply 38 provides a positive voltage for the anode 40 of the gas tube, and also some of the biasing voltage for the grid 28 to prevent the gas tube from conducting. The energizing winding of a relay 42 is connected in the output circuit of the gas tube, the relay being operatively connected with the valve 14 in the liquid supply line. The grid circuit of the gas tube includes a normally open switch 52, and the anode circuit a normally closed switch 54 connected to the relay 42.

The operation of the device is as follows:

The valve 14 is opened automatically or otherwise and liquid pours into the container 10. The oscillator 16 in operating condition provides bias for the control grid 28, in addition to that derived from the potentiometer 36, sufficient to prevent conduction in the gas tube. Waves of ultrahigh-frequency electrical energy from the oscillator are applied to the material in the container by means of the utilization circuit 24—26. When the liquid in the container reaches a certain level, it will be resonant with the oscillator 16. When other conditions affecting the same are unchanged, the level at which resonance occurs is determined by the wave length of the generated energy in the liquid. At resonance a sharp drop in grid current of the oscillator occurs (see Fig. 3). This drop in grid current is indicated by the meter 44 and also removes part of the bias from the gas tube causing the latter to conduct. Anode current of the gas tube now flows in the energizing winding of the relay 42 which closes the valve 14 and cuts off the supply of liquid to the container 10.

The switch 52 in the grid circuit of the gas tube may be connected with the valve 14, so as to prevent ignition of the tube except when material is supplied to the container. The relay 42 opens the switch 54, de-energizing the gas tube once it has fired and closed the valve 14.

It is within the scope of the invention to perform any indicating or other operation in consequence of the change in the electrical characteristics of the oscillator caused by the condition of resonance between the material in the container and the oscillator. For example, the invention may be employed to prevent dielectric material in a container from falling below a desired level or to give an alarm when a predetermined level is reached. The operative means for effecting these results may be actuated by a change in anode current of the oscillator, as well as by a drop in grid current.

The potentiometer 36 acts as a sensitivity control. Its setting determines what change in conditions will cause ignition of the gas tube. The frequency of the oscillator may be varied so as to ignite the gas tube at different levels of the material in the container.

It is believed that the material in the container acts as a section of a dielectric wave guide for the energy applied to it from the source 16 through the utilization circuit 24—26. Owing to the fact that the dielectric constant of the material is different from that of the ambient air, part of the energy propagated within the material in the container is reflected at its boundaries. This situation is indicated by Fig. 4 which is not, however, intended to be a perfect representation of what occurs. Another way of regarding the same operation is that as the height of the material in the container varies, the impedance of the material and, therefore, the load which it presents to the oscillator varies also.

Multiple reflections take place at the sides of the column of material, and the waves thus reflected combine with other waves reflected from the top and bottom of the material in the container. For a column of material of given shape, dimensions and dielectric constant, a frequency may be chosen at which a column of material of desired level will be resonant with the source. Under a given set of conditions such a relation exists between the reflected and transmitted waves that a condition of resonance is set up between the material and the oscillator. Amongst the factors which affect this condition are (a) the frequency of the propagated energy, (b) the coupling between the antenna and the material, (c) the dielectric constant of the material, (d) the width or diameter and shape of the column of material, (e) the height of the column of material, that is, the level of the material in the container. All of these factors, except the last, may be kept constant and the level of material changed until resonance occurs. When the height of the column of material in the container is long in relation to its diameter the level of material at which resonance occurs is nearly inversely proportional to the frequency of the wave causing that condition.

Referring to Fig. 4, when the reflected wave R is greatest the material acts as a parallel resonant circuit, but when the transmitted wave T is greatest the material acts as a series resonant circuit.

The invention may be applied to any dielectric material provided only that its dielectric constant is different from, or at least greater than, that of the surrounding medium. When air is the surrounding medium the dielectric constant of the material must be greater than unity. This condition excludes most gases, but the level of many dielectric liquids and powders, for example, water or dry sand, may be measured in accordance with the invention. Liquids with an acid content, for example, carbonated beverages, may also be measured if the acid content is not too great. The conductivity of the acid causes a flattening of the dip in grid current due to resonance (Fig. 3).

The invention has been successfully applied to the measurement of the level of water, dry sand, and of some carbonated beverages, using a frequency of 300 megacycles per second, and an ordinary drinking glass or a waxed paper cup as container. For materials of different dielectric constant and for containers of different sizes and shapes exciting waves of different frequencies may be necessary. The invention may also be applied to the measurement of small solid dielectric particles of nearly constant size, provided that the air space between particles is not too great. The materials to which the invention may be applied are referred to in this specification and the accompanying claims as "pourable dielectric materials."

The apparatus of the invention distinguishes between the real and froth levels of material to be measured, because froth consists mainly of air, and the liquid or other material forms only a small part of the froth; the dielectric constant of the froth is, therefore, substantially equal to that of the surrounding air, and the ultra high-frequency waves propagated within the material are reflected back at the real surface of the material instead of at the froth level.

The invention may be carried out with the utilization circuit electrodes in different positions from those shown in Figs. 1 and 2. The two sections may be at the top and bottom, or on both sides, or at the top and one side respectively of the container. It may, however, be necessary to alter the frequency of the propagated waves to procure resonance at a given level with different antenna positions. It is believed that the operation of the device described is not primarily dependent on a change in electrical capacity caused by the changing level of the material in the container. If it were, the relative positions of the electrodes to each other and to the container would be critical.

With external excitation as heretofore described the container 10 should be of dielectric material. When the container is of metal, the material in the container must be excited internally. Fig. 5 illustrates one manner in which this may be effected. One electrode 46 coupled to the oscillator 16 is located above the material, while the container itself may constitute the other electrode. If the container is made of a material which is a poor conductor, for example, carbon, it may absorb so much of the energy propagated within the material to be measured that no indication of resonance will be obtained.

It may be desirable in practice to provide a shield of conductive or insulating material around the container while the level is being measured, so as to prevent interference by any outside agency, for example, the hand or body of an operator. In the absence of such a shield, energy from the electrodes may be absorbed by the body of the operator, and cause ignition of the gas tube before the desired level is reached.

There has thus been described and improved method of and means for measuring the level of pourable dielectric material in a container. Waves of ultra high-frequency energy are propagated within the material and as the level of the material changes, its impedance and, therefore, the load which it presents to the source of energy varies also. This causes corresponding changes in the electrical characteristics of the source of energy. In particular, at a given level and with a given frequency of oscillation a condition of resonance exists between the material and the source of oscillating energy and electrical changes accompanying this condition may be employed to give an indication of the level or to perform any other desired operation.

While the invention finds a particular application in measuring the real instead of the froth level of materials, it is not essential for the purposes of the invention that the material to be measured should be of the type which froths. The invention provides an accurate and sensitive method of and means for measuring the level of any pourable dielectric material.

I claim as my invention:

1. The method of filling a container with pourable dielectric material to a predetermined level, which comprises applying ultra high-frequency energy from a source thereof to a circuit, effectively connecting the container to said circuit, pouring the material into the container whereby to vary the level of the material in the container and to propagate waves of ultra high-frequency energy in said material thereby varying the impedance of said circuit and the electrical condition of said source, and cutting off the supply of material to the container in response to an electrical condition of said source representative of said predetermined level.

2. The method of filling a container with pourable dielectric material to a predetermined level, which comprises supplying said material to said container, propagating and reflecting within the material in said container waves of high-frequency energy from a source of such energy, and stopping the supply of said material to said container in response to a condition of resonance between the material in the container and said source due to the attainment by said material of said predetermined level.

3. The method of filling a container with pourable dielectric material to a predetermined level, which comprises supplying the material to the container, propagating within the material in the container from a source of ultra high-frequency electrical energy waves of said energy of such wave length that the material in the container at said predetermined level resonates, and cutting off the supply of material to the container in response to said resonance.

4. The method of filling a container with pourable dielectric material to a predetermined level, which comprises supplying the material to the container, coupling the material in the container to a source of ultra high-frequency electrical energy of such wave length that the material in the container at said predetermined level is at resonance with said source, and cutting off the supply of material to the container in response to said resonance.

5. The method of filling a container to a predetermined level with a dielectric material of the type which has an actual level and also an apparent level due to froth or the like, said method comprising supplying said material to the container, propagating within the material in the container waves of ultra high-frequency energy from a source of such energy, and cutting off the supply of said material to said container in response to a condition of resonance between said material and said source caused by the attainment by said material of said predetermined level.

6. The method of indicating the level of pourable dielectric material in a container, which comprises propagating and reflecting within said material waves of ultra high-frequency energy from a source of such energy, varying the level of the material in the container, and indicating a condition of resonance between said material and said source as a measure of the level of said material.

7. The method of indicating the level of pourable dielectric material in a container, which comprises generating waves of high-frequency energy, applying said energy to said material, varying the level of said material in said container whereby to vary the load presented to the source of said energy, and indicating variations in said loading as a measure of the level of said material.

8. In a dispensing device for pourable dielectric material, the combination of means for supplying said material to a dielectric container, a source of ultra high-frequency energy, means for applying energy from said source to said container, and means for cutting off the supply of material to the container, said last-mentioned means being responsive to a change in the resonant condition of said source caused by a change in the level of material in the container, and said change in resonant condition being due to waves of reflected energy propagated in said material.

9. In a dispensing device for pourable dielectric material, the combination of means for supplying said material to a dielectric container, a source of high-frequency energy, means for propagating within the material in the container waves of energy from said source, and means responsive to a condition of resonance between the material in the container and said source for cutting off the supply of the material to the container.

10. In a dispensing device for pourable dielectric material, the combination of means for supplying said material to a dielectric container, a source of ultra-high-frequency energy, a utilization circuit coupled to said source and adjacent said container, the dielectric material and container constituting a guide for waves of energy from said source, and said guide being excited by means of said circuit, and means responsive to a condition of resonance between the material in the container and said source for cutting off the supply of material to the container.

11. In apparatus for procuring a predetermined level of pourable dielectric material in a dielectric container, the combination of a source of ultra high-frequency energy, a utilization circuit coupled to said source and partially defining a space adapted to receive said container, means for varying the level of the material in the container whereby to vary the impedance of said circuit and the electrical condition of said source and thereby to secure different electrical conditions of said source representative of different levels of said material, said different electrical conditions being caused by reflected waves of energy propagated in said material, and means responsive to an electrical condition of said source representative of said predetermined level for rendering said level-varying means inoperative.

12. The combination according to claim 11 wherein said utilization circuit is constituted by a flat spiral of conducting material adjacent to the bottom of the conductor and by a conductive section adjacent to and parallel with the length of the conductor.

JOHN B. GEHMAN.

REFERENCES CITED

The following references are of record in the file of this patent:

UNITED STATES PATENTS

| Number | Name | Date |
|---|---|---|
| 1,889,663 | Ilyus | Nov. 29, 1932 |
| 2,361,837 | Gilmore | Oct. 31, 1944 |